United States Patent Office 3,552,243
Patented Jan. 5, 1971

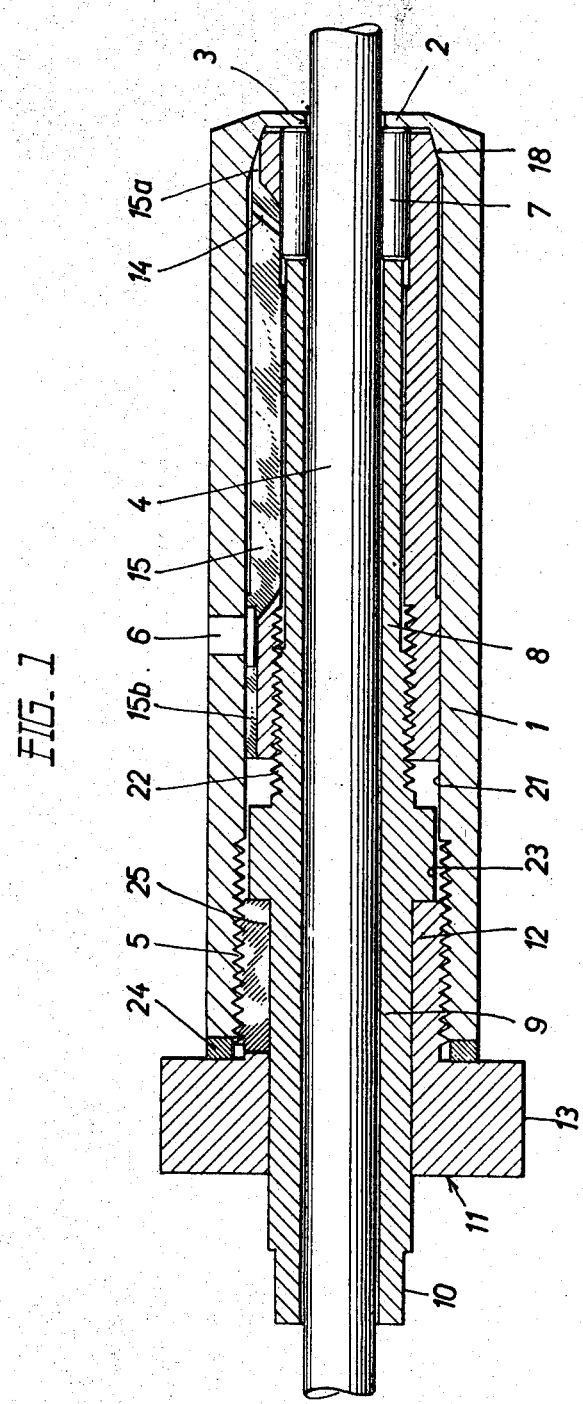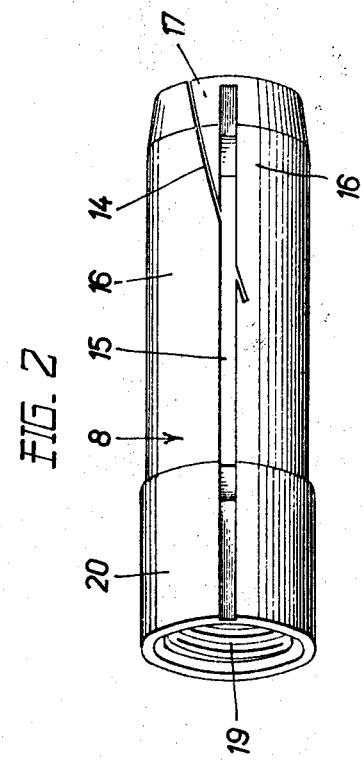

3,552,243
GUIDING SLEEVE FOR AUTOMATIC LATHES WITH A SLIDING HEADSTOCK
Harold Habegger, Sous Graitery, Bern, Switzerland
Filed Jan. 30, 1969, Ser. No. 795,243
Claims priority, application Switzerland, Oct. 17, 1968, 1,936/68
Int. Cl. B23b 25/00
U.S. Cl. 82—38                                    2 Claims

ABSTRACT OF THE DISCLOSURE

The guiding sleeve engages and guides the bar of stock machined upon by the lathe only by means of a crown of rotary rollers located in a chuck permitting the clearance of the stock bar to be adjusted. The rollers are held in their axial position with an axial free play which can be adjusted by means of a calibrated spacing ring inserted between two pieces of the guiding sleeve, which are screwed into one another until the spacing ring is locked.

BACKGROUND OF THE INVENTION

(1) Field of the invention

The invention relates to the guiding sleeves for automatic lathes with a sliding headstock and particularly to that type of sleeves comprising a crown of rotatory rollers adapted for engaging the bar of stock machined upon and guiding the same during the work of the lathe, these rollers being located in a chuck permitting the clearance of the bar of stock within the crown of rollers to be adjusted upon producing a relative axial motion between the chuck and another piece of the guiding sleeve provided both with corresponding truncated conical surfaces.

(2) Description of the prior art

With the known guiding sleeves of the type considered here, the axial free play of the rollers can be adjusted by means of a screw or nut screwed into the chuck which holds the rollers in a radial direction.

These known guiding sleeves have thus the drawback that the free play of the rollers in the axial direction has to be adjusted every time the chuck is moved for adjusting the clearance of the stock bar within the rollers, i.e. every time a new series of stock bars are to be machined upon.

SUMMARY OF THE INVENTION

The main object of the invention is therefore to simplify the adjusting operations of the guiding sleeve by rendering the adjustment of the clearance of the stock bar within the rollers independent of that of the free play of the rollers in the axial direction to such an extent that this free play of the rollers in the axial direction will not at all be modified when adjusting the clearance of the stock bar within the rollers, the means provided for adjusting the axial free play of the rollers being provided in such manner that they cannot leave their adjusted positions when the guiding sleeve is in use.

In the guiding sleeve improved according to the invention, this main object is performed by means of a calibrated spacing ring which is inserted between two pieces of the sleeve screwed into one another and provided for holding the rollers in place in the axial direction, said calibrated spacing ring holding the two pieces between which it is inserted at the correct distance from one another when they are screwed into each other until the spacing ring is locked therebetween, thus making sure that the rollers have the correct free play in the axial direction.

BRIEF DESCRIPTION OF THE DRAWING

One embodiment of the guiding sleeve improved according to the invention is represented diagrammatically and by way of example in the accompanying drawing.

In the drawing:

FIG. 1 is a longitudinal diametrical section of that embodiment, a bar of stock being inserted in the guiding sleeve, and FIG. 2 is a perspective view of a piece of the sleeve represented in FIG. 1.

DESCRIPTION OF THE PREFERRED EMBODIMENT

The guiding sleeve represented in the drawing comprises a cylindrical housing 1 arranged so that it can be inserted in a bore of the standard plate of the lathe provided for holding the radial tools thereof, which are arranged fanwise around said bore of the standard. At its front end, housing 1 comprises an inner rim 2, the opening 3 of which has a diameter only slightly larger than that of the bars of stock 4 which the sleeve represented has to guide during the machining operations carried out thereon. The rear end of housing 1 is tapped as shown at 5. Housing 1 finally carries a stud bolt 6 in its middle section.

A crown of rollers 7, a chuck 8 and a control member 9 provided with a prismatic head portion 10 are located within housing 1. The members 7 to 9 are held axially in place within housing 1 by means of a screw nut 11 provided with a screw-threaded tubular projection 12 screwed into the tapped portion 5 of housing 1. Nut 11 has a prismatic head portion 13.

The rollers 7 extend within an inner groove of the guiding sleeve. The two side faces and the bottom face of that groove are formed on three different pieces of the guiding sleeve. The fore side face of the groove is formed by a portion of the plane inner side face of rim 2 of housing 1. The bottom surface of the groove is constituted by the inner cylindrical surface of the front portion of chuck 8. Finally, the rear side face of the groove consists of the plane fore end surface of control member 9. The guiding sleeve represented guides the stock bar 4 machined upon by means of the rollers 7. It will appear to those skilled in the art that these rollers 7 safely remain in their groove even if no stock bar is inserted in the sleeve. This is namely due to the fact that there is only a very small free play remaining between two adjacent rollers 7. The diameter of the latter is preferably chosen in such manner that their whole crown will comprise an odd number of rollers.

The chuck 8 represented in a perspective view in FIG. 2 has the general shape of a cylindrical sleeve. Three oblique slots 14, regularly staggered around the axis of the chuck, provide for its resiliency. Each slot 14 intersects an axial slot 15. The three pairs of slots 14, 15 thus define three parts constituting the jaws 16 of the chuck 8. The one slot 15 appearing in FIG. 1 has two extensions in the form of groove portions 15a, 15b extending outwards to the fore and rear ends, respectively, of the chuck for receiving the stud bolt 6. Chuck 8 and housing 1 are accordingly fixed to each other for rotary motion. Chuck 8 can however move freely in an axial direction relative to housing 1. Chuck 8 is provided at its fore end with an outer truncated conical surface 17 cooperating with a corresponding inner truncated conical surface 18 of housing 1. At its rear end, chuck 8 is provided with a tapped portion 19 as well as with a bearing surface 20 adjusted to the bore 21 of housing 1.

The control member 9 carries a threaded portion 22 screwed into the tapped portion 19 of chuck 8. Moreover, it carries a collet 23 butting against the front end surface of the tubular projection 12 of nut 11. Member 9 is accordingly held in a predetermined axial position between this tubular projection 12 and the rollers 7.

The axial free play of rollers 7 is adjusted by means of a calibrated spacing ring 24, i.e. of a ring picked out of a set of rings having exactly predetermined thicknesses regularly staggered every hundredth or every other hundredth of mm. Adjusting the free play of the rollers in the axial direction occurs by inserting a spacing ring of the appropriate thickness between housing 1 and nut 11, i.e. such that after having screwed nut 11 into housing 1 until ring 24 is locked, the end face of the tubular projection 12 holds the control member in such an axial position that the rollers 7 have the desired axial free play. The calibrated spacing ring 24 inserted between the housing 1 and the nut 11 thus enables adjusting the axial free play of the rollers once forever. This free play cannot be modified in use since nut 11 is screwed down into housing 1 and is consequently locked. However, if either the end faces of rollers 7 or the plane surface portions of ring 2 or of member 9 along which there is a frictional engagement with the rollers, become worn, the axial free play of these rollers can be readjusted. Therefore, it suffices to replace ring 24 by a flatter one.

Since member 9 is held in a predetermined axial position within housing 1, rotating this member with respect to housing 1 causes chuck 8 to move in the axial direction, because of the engagement of the threaded portions 19 and 22. Moreover, since the chuck 8 is forcibly caused to move to and fro in the axial direction, the truncated conical surfaces 17 and 18 can be made with a relatively small opening angle, while avoiding the risk that chuck 8 remains clamped in closing position when it is desired to open the same. A small opening angle of the truncated conical surfaces 17 and 18 has finally the advantage of providing a smooth progressive closure of chuck 8.

The gripping strength of chuck 8 can easily be adjusted for every bar of stock 4, if supplying the lathe with new stock bars occurs manually. If an automatic bar feeding device is associated with the lathe, a driving piece need only be set on the prismatic head portion 10 of member 9 in order to open and close the guiding sleeve disclosed in an automatic manner during every cycle of operations, i.e. once during every revolution of the cam shaft. Alternately, opening and closing chuck 8 could occur only during some particular cycles of operation, for instance on the occasion of the cycles during which a new stock bar is supplied to the lathe.

To increase the life time of the improved guiding sleeve, the rollers 7 are preferably made out of a hard metal such as a sintered metallic carbide.

In view of the small diameter of opening 3, rim 2 has the advantage that it prevents the chips from entering the guiding sleeve. On the contrary, the cooling oil can freely enter the guiding sleeve and lubricate rollers 7.

To prevent an inopportune rotary motion of member 9 and accordingly an undesired modification of the gripping strength of chuck 8 in the cases where member 9 is to be adjusted manually, radial slots 25 are provided in the tubular projection 12 of nut 11 and the parts of this projection defined by slots 25 are slightly bent inwards so as to produce a gripping action on member 9 preventing the same from rotating inopportunely.

What I claim is:

1. A guiding sleeve for automatic lathes with a sliding headstock, comprising, in combination, a crown of rotary rollers adapted for engaging the bar of stock machined upon and guiding same during the work of the lathe, a chuck holding said rollers in a radial direction and being provided with a truncated conical surface cooperating with a corresponding truncated conical surface of another piece of the guiding sleeve for adjusting the clearance of the bar of stock within the crown of rollers upon producing a relative axial motion between said chuck and said other piece of the guiding sleeve, a pair of pieces screwed into one another for holding said rollers in place in the axial direction, and a calibrated spacing ring inserted between the two pieces of said pair for adjusting the free play of the rollers in the axial direction when said pieces are screwed into one another until said spacing ring is locked therebetween.

2. The guiding sleeve as claimed in claim 1, further comprising a rotary control member adapted for causing said chuck to move in the axial direction, said control member being inserted between said rollers and one piece of said pair of pieces screwed into one another, thus being axially held in place.

References Cited

UNITED STATES PATENTS 2,757,565   8/1956   Fluskey et al. _____ 82—39
3,115,800   12/1963   Megel et al. _____ 82—38

LEONIDAS VLACHOS, Primary Examiner